(12) United States Patent
Mazaki et al.

(10) Patent No.: US 9,748,773 B2
(45) Date of Patent: Aug. 29, 2017

(54) CONTACTLESS POWER SUPPLY DEVICE

(71) Applicant: DENSO CORPORATION, Kariya, Aichi-pref. (JP)

(72) Inventors: Kouji Mazaki, Kariya (JP); Eisuke Takahashi, Kariya (JP); Kazuyoshi Obayashi, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 333 days.

(21) Appl. No.: 14/389,591

(22) PCT Filed: Mar. 20, 2013

(86) PCT No.: PCT/JP2013/001893
§ 371 (c)(1),
(2) Date: Sep. 30, 2014

(87) PCT Pub. No.: WO2013/145648
PCT Pub. Date: Oct. 3, 2013

(65) Prior Publication Data
US 2015/0076918 A1 Mar. 19, 2015

(30) Foreign Application Priority Data

Mar. 30, 2012 (JP) .................................. 2012-081860

(51) Int. Cl.
*H01F 27/42* (2006.01)
*H01F 37/00* (2006.01)
(Continued)

(52) U.S. Cl.
CPC .............. *H02J 5/005* (2013.01); *B60L 1/003* (2013.01); *B60L 11/182* (2013.01);
(Continued)

(58) Field of Classification Search
CPC .. H02J 50/10; H02J 50/70; H02J 50/80; H02J 5/005; H02J 7/025
(Continued)

(56) References Cited

U.S. PATENT DOCUMENTS

2007/0064406 A1 3/2007 Beart
2011/0084652 A1* 4/2011 Julstrom ................. H02J 7/025
320/108

(Continued)

FOREIGN PATENT DOCUMENTS

JP 8-37121 2/1996
JP 9-213550 8/1997
(Continued)

OTHER PUBLICATIONS

Office Action (2 pages) dated Sep. 15, 2015, issued in corresponding Japanese Application No. 2012-081860 and English translation (5 pages).

(Continued)

*Primary Examiner* — Carlos Amaya
(74) *Attorney, Agent, or Firm* — Nixon & Vanderhye PC

(57) ABSTRACT

A contactless power supply device includes a power-transmitting-side pad and a power-receiving-side pad. Each of the power-transmitting-side pad and the power-receiving-side pad has a core and a coil. The core has a plate-shaped yoke portion. The coil has a first coil portion and a second coil portion. The first coil portion is arranged on a top surface of the yoke portion. The second coil portion is arranged along an outer periphery of the yoke portion.

10 Claims, 12 Drawing Sheets

(51) Int. Cl.
  *H01F 38/00* (2006.01)
  *H02J 5/00* (2016.01)
  *H01F 38/14* (2006.01)
  *H02J 7/02* (2016.01)
  *B60L 1/00* (2006.01)
  *B60L 11/18* (2006.01)
  *H01F 27/28* (2006.01)
  *H02J 17/00* (2006.01)
  *B60M 7/00* (2006.01)
  *H01F 27/34* (2006.01)

(52) U.S. Cl.
  CPC ....... *B60L 11/1824* (2013.01); *B60L 11/1829* (2013.01); *B60L 11/1833* (2013.01); *B60L 11/1838* (2013.01); *B60L 11/1868* (2013.01); *H01F 27/28* (2013.01); *H01F 38/14* (2013.01); *H02J 7/025* (2013.01); *H02J 17/00* (2013.01); *B60L 2210/10* (2013.01); *B60L 2210/30* (2013.01); *B60L 2210/40* (2013.01); *B60M 7/003* (2013.01); *H01F 2027/348* (2013.01); *Y02T 10/7005* (2013.01); *Y02T 10/7066* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01)

(58) Field of Classification Search
  USPC .......................................................... 307/104
  See application file for complete search history.

(56) References Cited

U.S. PATENT DOCUMENTS

| | | |
|---|---|---|
| 2011/0086256 A1 | 4/2011 | Julstrom et al. |
| 2012/0200151 A1 | 8/2012 | Obayashi et al. |
| 2014/0084697 A1* | 3/2014 | Yasuda ................. B60L 11/182 |
| | | 307/104 |

FOREIGN PATENT DOCUMENTS

| | | |
|---|---|---|
| JP | 2010-172084 | 8/2010 |
| JP | 2011-142177 | 7/2011 |
| JP | 2012-231603 | 11/2012 |

OTHER PUBLICATIONS

International Search Report for PCT/JP2013/001893, mailed Jul. 2, 2013, 2 pages.
Written Opinion of the ISA for PCT/JP2013/001893, mailed Jul. 2, 2013, with English-translation, 4 pages.
Office Action (6 pages) dated Dec. 28, 2015, issued in corresponding Chinese Application No. 201380016570.3 and English translation (8 pages).

* cited by examiner

US 9,748,773 B2

CONTACTLESS POWER SUPPLY DEVICE

CROSS REFERENCE TO RELATED APPLICATION

This application is the U.S. national phase of International Application No. PCT/JP2013/001893 filed on Mar. 20, 2013, which designated the U.S., and claims priority to Japanese Patent Application No. 2012-81860 filed on Mar. 30, 2012, the contents of which are incorporated herein by reference.

TECHNICAL FIELD

The present disclosure relates to a contactless power supply device for transmitting power from a power-transmitting-side pad to a power-receiving-side pad in a contactless manner with the power-transmitting-side pad and the power-receiving-side pad facing each other.

BACKGROUND ART

For example, a patent document 1 discloses a contactless power supply device for transmitting power from a power-transmitting-side pad to a power-receiving-side pad in a contactless manner with the power-transmitting-side pad and the power-receiving-side pad facing each other.

This contactless power supply device is used to transmit power in a contactless manner to a battery mounted on an electric vehicle or a hybrid vehicle as a power supply source to run the vehicle. The contactless power supply device includes the power-transmitting-side pad and the power-receiving-side pad. Each of the power-transmitting-side pad and the power-receiving-side pad has a plate-shaped core and a coil. The coil is wound on the plate-shaped core. Power is transmitted from the power-transmitting-side pad to the power-receiving-side pad in a contactless manner with the power-transmitting-side pad and the power-receiving-side pad facing each other in a top-bottom direction.

As described above, the coil is wound on the plate-shaped core. Accordingly, the coil is arranged along a top surface and a bottom surface of the plate-shaped core. Therefore, it is impossible to reduce the sizes of the power-transmitting-side pad and the power-receiving-side pad in the top-bottom direction.

PRIOR ART

Patent Document

Patent Document 1: JP-A-2010-172084

SUMMARY OF THE INVENTION

In view of the above, it is an object of the present disclosure to provide a contactless power supply device in which a size of a power-transmitting-side pad and a size of a power-receiving-side pad can be reduced.

According to a first aspect of the present disclosure, a contactless power supply device includes a power-transmitting-side pad and a power-receiving-side pad. Each of the power-transmitting-side pad and the power-receiving-side pad has a core made of a magnetic material and a coil in contact with the core. The power-transmitting-side pad transmits power to the power-receiving-side pad in a contactless manner with the power-transmitting-side pad and the power-receiving-side pad facing each other. The core has a plate-shaped yoke portion. The coil has a first coil portion and a second coil portion. The first coil portion is arranged on one of opposing surfaces of each yoke portion in a thickness direction of the yoke portion, and the one of the opposing surfaces of the yoke portion of the power-transmitting-side pad faces the one of the opposing surfaces of the yoke portion of the power-receiving-side pad. The second coil is arranged along an outer periphery of each yoke portion.

According to a first aspect of the present disclosure, the coil is arranged along the outer periphery of each yoke portion and arranged on the one of the opposing surfaces of each yoke portion in the thickness direction. The one of the opposing surfaces of the yoke portion of the power-transmitting-side pad faces the one of the opposing surfaces of the yoke portion of the power-receiving-side pad. Unlike the prior art, the coil is not arranged on both the opposing surfaces of each yoke portion in the thickness direction. Thus, the size of the power-transmitting-side pad and the size of the power-receiving-side pad can be reduced in the thickness direction.

BRIEF DESCRIPTION OF THE DRAWINGS

The above and other objects, features and advantages of the present disclosure will become more apparent from the following detailed description made with reference to the accompanying drawings. In the drawings.

EMBODIMENTS OF THE INVENTION

Figure 1:
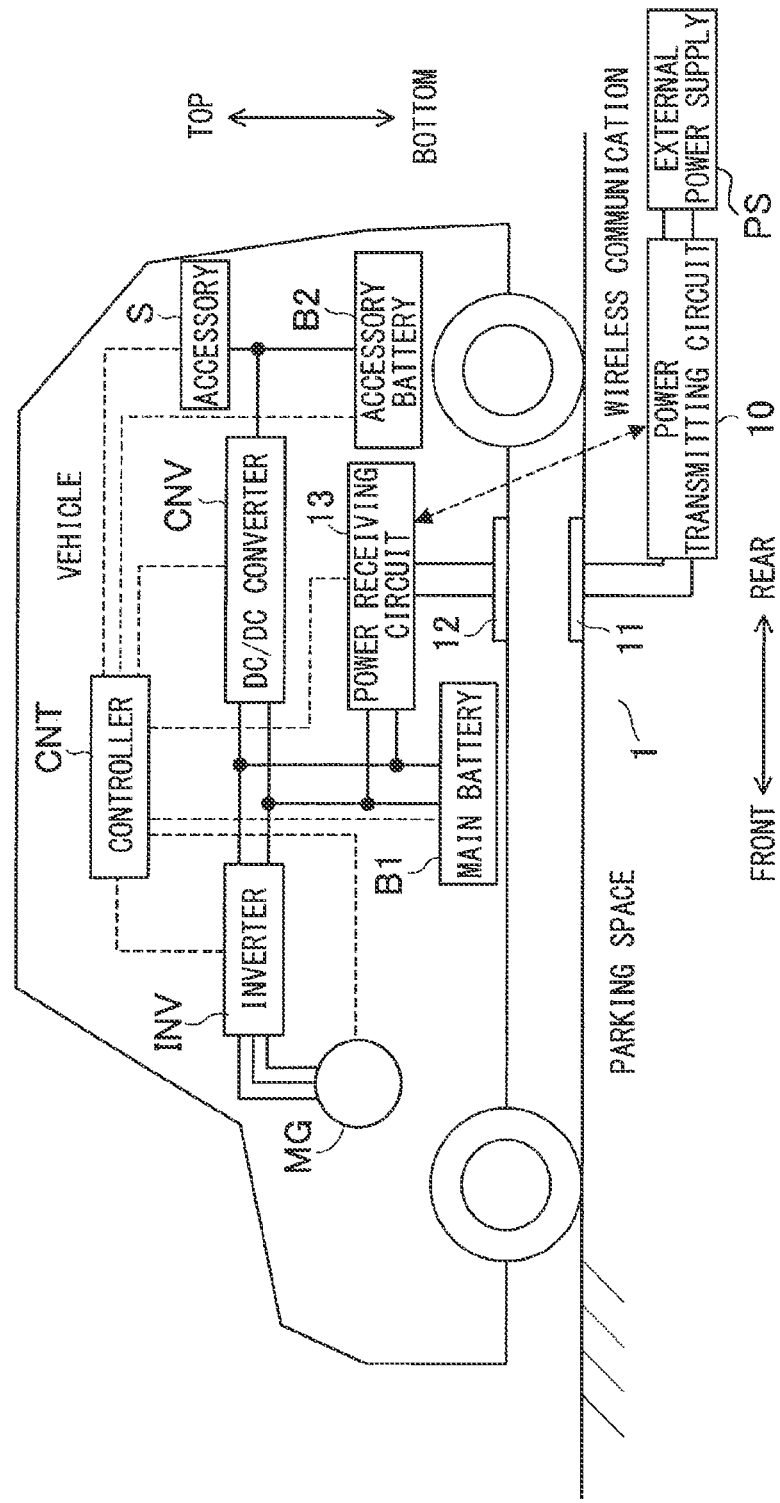
FIG. 1 is a schematic of a contactless power supply device according to a first embodiment.

Next, the present disclosure is described in detail with embodiments. In the embodiments, a contactless power supply device according to the present disclosure is applied to a contactless power supply device for transmitting power in a contactless manner to a main battery mounted on an electric vehicle or a hybrid vehicle.

First Embodiment

A configuration of a contactless power supply device according to a first embodiment is described with reference to FIGS. 1-4. In the drawings, front, rear, left, right, top, and bottom indicate directions in the vehicle.

As shown in FIG. 1, the electric vehicle or the hybrid vehicle is equipped with a motor generator MG, a main battery B1, an inverter circuit INV, an accessory S, an accessory battery B2, a DC/DC converter circuit CNV, and a controller CNT.

The motor generator MG is supplied with a three-phase AC voltage and acts as a motor for generating driving force to run the vehicle. Further, during deceleration of the vehicle, the motor generator MG is rotated by external driving force and acts as a generator for generating a three-phase AC voltage.

The main battery B1 is a rechargeable power supply for outputting a high DC voltage.

The inverter circuit INV converts a high DC voltage outputted by the main battery B1 to a three-phase AC voltage and supplies the three-phase AC voltage to the motor generator MG when the motor generator MG acts as a motor. Further, the inverter circuit INV converts a three-phase AC voltage outputted by the motor generator MG to a high DC voltage and supplies the high DC voltage to the main battery B1 when the motor generator MG acts as a generator.

The accessory S is a peripheral apparatus capable of operating on a low DC voltage and includes an air conditioner and an electric power steering apparatus.

The accessory battery B2 is a rechargeable power supply for outputting a low DC voltage.

The DC/DC converter circuit CNV converts a high DC voltage outputted by the main battery B1 to a low DC voltage and supplies the low DC voltage to the accessory battery B2 and the accessory S.

The controller CNT controls the inverter circuit INV, the DC/DC converter circuit CNV, and the accessory S based on information related to the main battery B1, the accessory battery B2, and the motor generator MG.

A contactless power supply device 1 transmits power in a contactless manner from an external power supply PS installed outside the vehicle to the main battery B1 mounted on the vehicle in order to charge the main battery B1. The contactless power supply device 1 includes a power transmitting circuit 10, a power-transmitting-side pad 11, a power-receiving-side pad 12, and a power receiving circuit 13.

The power transmitting circuit 10 transmits and receives information to and from the power receiving circuit 13 by wireless communication, converts a voltage outputted by the external power supply PS to a high-frequency AC voltage based on the received information, and applies the high-frequency AC voltage to the power-transmitting-side pad 11. The power transmitting circuit 10 is installed outside the vehicle.

The power-transmitting-side pad 11 generates magnetic flux when being supplied with an electric current and is installed at a predetermined position on the ground in a parking space so that the power-transmitting-side pad 11 can face the power-receiving-side pad 12 installed at a bottom of the vehicle when the vehicle is parked in the parking space.

Figure 2:
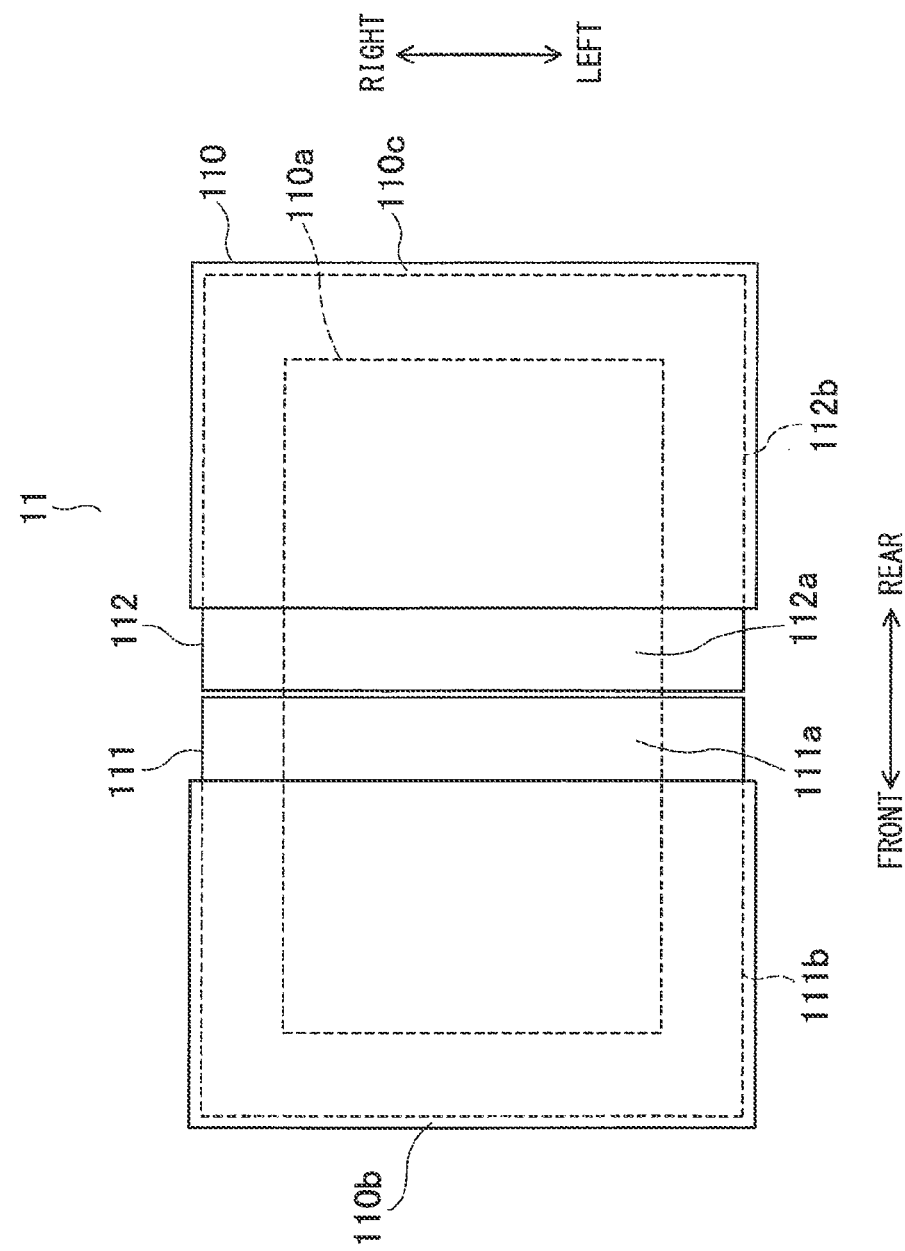
FIG. 2 is a top view of a power-transmitting-side pad according to the first embodiment.
Figure 3:
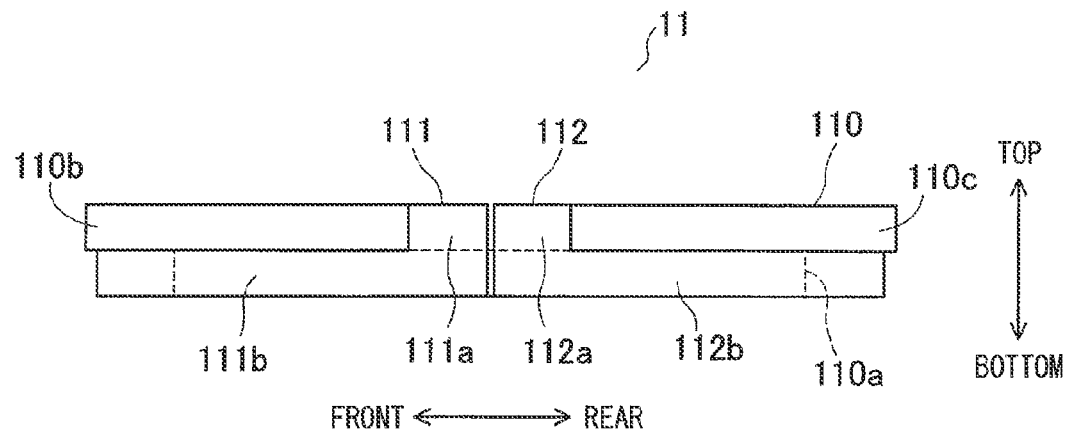
FIG. 3 is a left side view of the power-transmitting-side pad according to the first embodiment.

As shown in FIGS. 2-3, the power-transmitting-side pad 11 includes a core 110 and coils 111, 112.

The core 110 provides a magnetic path and is made of a magnetic material which forms a magnetic pole. Specifically, the core 110 is made of a high magnetic permeability material such as ferrite. The core 110 includes a yoke portion 110*a* and magnetic pole portions 110*b*, 110*c*.

The yoke portion 110*a* has a rectangular shape like a plate and provides a magnetic path.

Each of the magnetic pole portions 110*b*, 110*c* has a rectangular shape like a plate, provides a magnetic path, and forms a magnetic pole.

Each of the coils 111 and 112 generates magnetic flux when being supplied with an electric current. Specifically, the coils 111 and 112 are made of a low electrical resistance material such as a Litz wire. The coil 111 has a first coil portion 111*a* and a second coil portion 111*b*, and the coil 112 has a first coil portion 112*a* and a second coil portion 112*b*.

The yoke portion 110*a* has top and bottom surfaces opposite to each other in its thickness direction. Out of the top and bottom surfaces of the yoke portion 110*a*, the first coil portion 111*a* is arranged along the top surface where the power-transmitting-side pad 11 faces the power-receiving-side pad 12. Specifically, the first coil portion 111*a* extends in the left-right direction almost at the middle of the yoke portion 110*a* in the front-rear direction. The second coil portion 111*b* is arranged along an outer periphery of the yoke portion 110*a*. Specifically, the second coil portion 111*b* is arranged along a left side surface, a front surface, and a right side surface of the yoke portion 110*a*.

Out of the top and bottom surfaces of the yoke portion 110*a*, the first coil portion 112*a* is arranged along the top surface where the power-transmitting-side pad 11 faces the power-receiving-side pad 12. Specifically, the first coil portion 112*a* extends in the left-right direction on the rear side than the first coil portion 111*a*. The second coil portion 112*b* is arranged along the outer periphery of the yoke portion 110*a*. Specifically, the second coil portion 112*b* is arranged along the left side surface, a rear surface, and the right side surface of the yoke portion 110*a*.

The magnetic pole portions 110*b* and 110*c* are in contact with the top surface of the yoke portion 110*a*, where the first coil portions 111*a* and 112*a* are arranged, surrounded by the coils 111 and 112. The magnetic pole portions 110*b* and 110*c* are structured so that the second coil portions 111*b* and 112*b* can be located within regions occupied by the magnetic pole portions 110*b* and 110*c* when viewed from the top-bottom direction as the thickness direction. The sizes of the magnetic pole portions 110*b* and 110*c* in the thickness direction are equal to the sizes of the first coil portions 111*a* and 112*a* in the top-bottom direction (the thickness direction). The yoke portion 110*a* and the magnetic pole portions 110*b* and 110*c* are integrated together.

The power-transmitting-side pad 11 is installed at the predetermined position on the ground in the parking space with end surfaces of the magnetic pole portions 110*b*, 110*c* facing upward so that the power-transmitting-side pad 11 can face the power-receiving-side pad 12 mounted on the vehicle when the vehicle is parked in the parking space. As shown in FIGS. 2-3, the power-transmitting-side pad 11 includes a core 110 and coils 111, 112.

As shown in FIG. 1, the power-receiving-side pad 12 is installed at the bottom of the vehicle. When the vehicle is parked in the parking space, the power-transmitting-side pad 11 and the power-receiving-side pad 12 face each other with a predetermined clearance in the top-bottom direction. When magnetic flux generated by the power-transmittingside pad 11 crosses the power-receiving-side pad 12, the power-receiving-side pad 12 generates induced electromotive force due to electromagnetic induction. The power-receiving-side pad 12 includes a core and coils.

The core 110 includes a yoke portion and magnetic pole portions. Each coil includes a first coil portion and a second coil portion.

The power-receiving-side pad 12 has the same structure as the power-transmitting-side pad 11 but is upside down with respect to the power-transmitting-side pad 11. The power-receiving-side pad 12 is installed at the bottom of the vehicle with end surfaces of magnetic pole portions facing the bottom direction.

The power receiving circuit 13 transmits and receives information to and from the power transmitting circuit 10 by wireless communication and converts an AC voltage outputted by the power-receiving-side pad 12 to a DC voltage based on the received information to change the main battery B1.

Next, the operation of the contactless power supply device is described with reference to FIG. 1.

As shown in FIG. 1, when the vehicle is parked in the parking space, the power-transmitting-side pad 11 and the power-receiving-side pad 12 face each other with a predetermined clearance in the top-bottom direction. Under this condition, when a charge start button (not shown) is pressed to start charging, the power transmitting circuit 10 and the power receiving circuit 13 transmit and receive information to and from each other by wireless communication.

The power transmitting circuit 10 converts a voltage outputted by the external power supply PS to a high-frequency AC voltage based on the received information and applies the high-frequency AC voltage to the power-transmitting-side pad 11.

When an AC current flows through the power-transmitting-side pad 11 upon application of the AC voltage, the power-transmitting-side pad 11 generates magnetic flux. When the magnetic flux generated by the power-transmitting-side pad 11 crosses the power-receiving-side pad 12, the power-receiving-side pad 12 generates induced electromotive force due to electromagnetic induction.

The power receiving circuit 13 converts an AC voltage outputted by the power-receiving-side pad 12 to a high DC voltage based on the received information to change the main battery B1.

Next, advantages are described.

Figure 4:
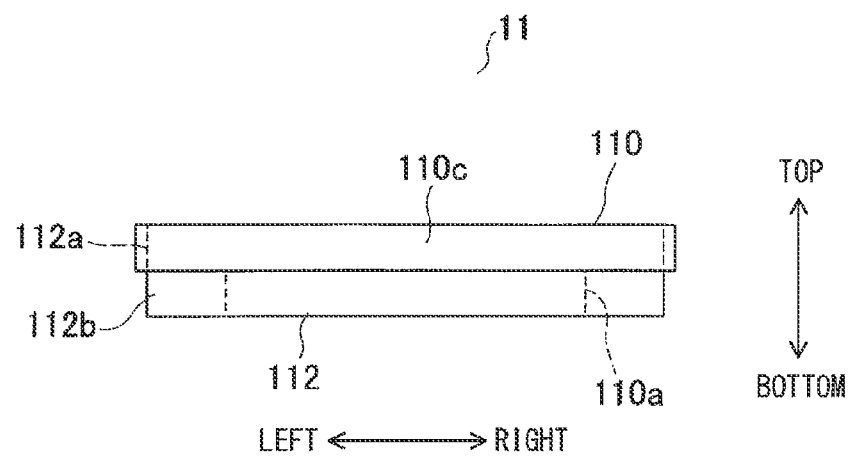
FIG. 4 is a rear side view of the power-transmitting-side pad according to the first embodiment.

According to the first embodiment, as shown in FIGS. 2-4, the coils 111, 112 are arranged along the top surface, where the power-transmitting-side pad 11 and the power-receiving-side pad 12 face each other, of the yoke portion 110a and also arranged along the outer periphery of the yoke portion 110a. Unlike the prior art, the coils are not arranged on a bottom surface of the yoke portion 110a. Thus, the size of the power-transmitting-side pad 11 can be reduced in the top-bottom direction. The size of the power-receiving-side pad 12, which has the same structure as the power-transmitting-side pad 11, can be also reduced in the top-bottom direction.

According to the first embodiment, as shown in FIGS. 2-4, the core 110 of the power-transmitting-side pad 11 has the magnetic pole portions 110b and 110c which are in contact with the top surface of the yoke portion 110a, where the first coil portions 111a and 112a are arranged, surrounded by the coils 111 and 112. Thus, magnetic flux generated by electric current flowing through the coils 111, 112 can be efficiently supplied to the power-receiving-side pad 12.

According to the first embodiment, as shown in FIG. 3, the sizes of the magnetic pole portions 110b and 110c in the thickness direction are equal to the sizes of the first coil portions 111a and 112a in the top-bottom direction. Thus, magnetic flux generated by electric current flowing through the coils 111, 112 can be efficiently supplied to the power-receiving-side pad 12 while the size of the power-transmitting-side pad 11 is reduced in the top-bottom direction.

According to the first embodiment, the magnetic pole portions 110b and 110c are structured so that the second coil portions 111b and 112b can be located within regions occupied by the magnetic pole portions 110b and 110c when viewed from the top-bottom direction as the thickness direction. Thus, the areas of top surfaces of the magnetic pole portions 110b and 110c can be increased. Therefore, even when the power-receiving-side pad 12 is misaligned, more magnetic flux can be supplied to the power-receiving-side pad 12. Further, the magnetic pole portions 110b and 110c can protect the second coil portions 111b and 112b from mechanical damage.

According to the first embodiment, the yoke portion 110a and the magnetic pole portions 110b and 110c are integrated together. Thus, the number of parts of the core 110 can be recued. Therefore, manufacturing cost can be reduced.

In the first embodiment, both the yoke portion 110a and the magnetic pole portions 110b and 110c, which are integrated together, are made of ferrite. However, the yoke portion 110a and the magnetic pole portions 110b and 110c are not limited to this example. The yoke portion 110a and the magnetic pole portions 110b and 110c can be made of materials having different magnetic properties. In such an approach, the magnetic property of the power-transmitting-side pad 11 can be finely adjusted.

Second Embodiment

Next, a contactless power supply device according to a second embodiment is described. The contactless power supply device of the second embodiment differs from the contactless power supply device of the first embodiment in sizes of yoke portions of a power-transmitting-side pad and a power-receiving-side pad in a front-rear direction. The contactless power supply device of the second embodiment has the same structure as the contactless power supply device of the first embodiment except the power-transmitting-side pad and the power-receiving-side pad.

Firstly, a structure of the power-transmitting-side pad is described with reference to FIGS. 5-7. In the drawings, front, rear, left, right, top, and bottom indicate directions in the vehicle.

Figure 5:
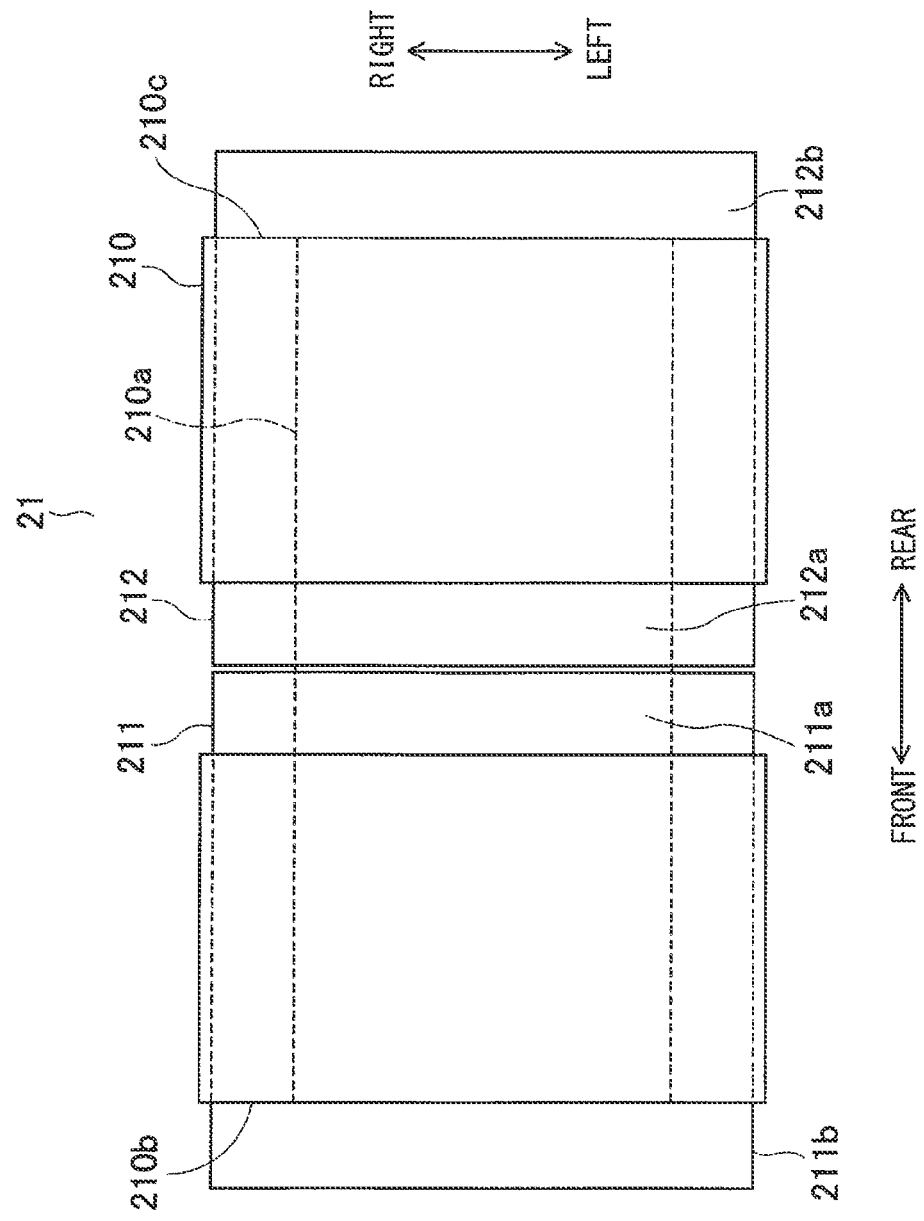
FIG. 5 is a top view of a power-transmitting-side pad according to a second embodiment.
Figure 6:
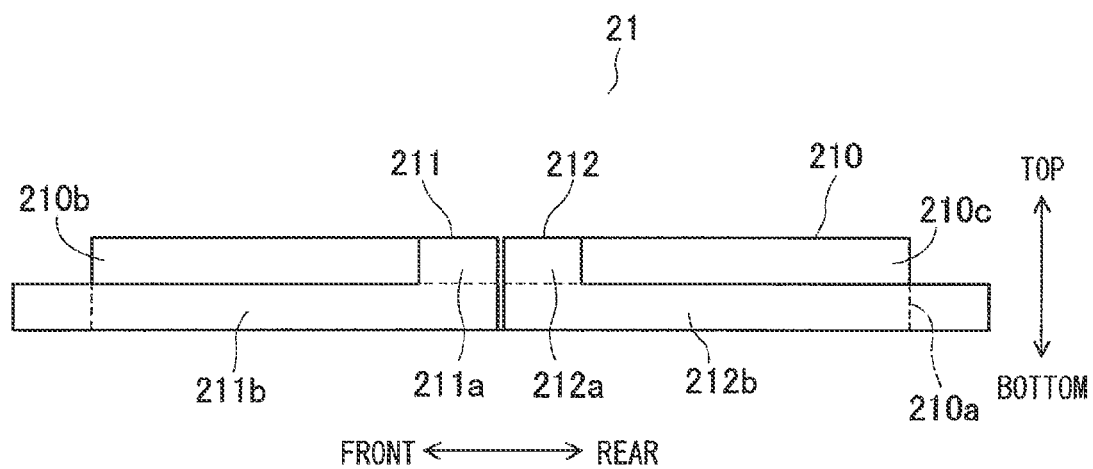
FIG. 6 is a left side view of the power-transmitting-side pad according to the second embodiment.
Figure 7:
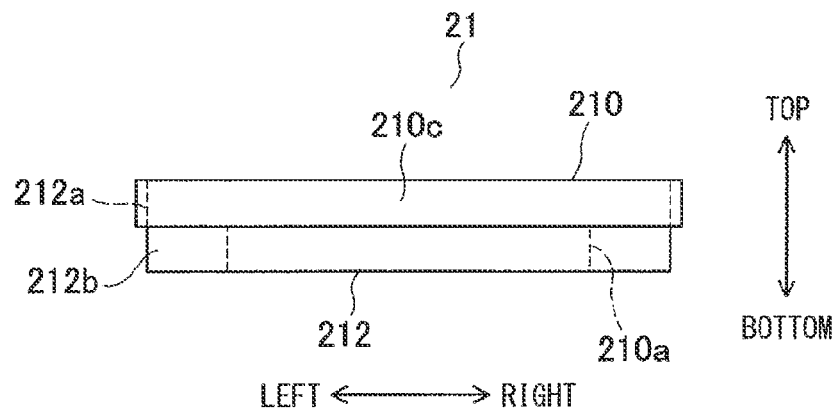
FIG. 7 is a rear side view of the power-transmitting-side pad according to the second embodiment.

As shown in FIGS. 5-7, a power-transmitting-side pad 21 includes a core 210 and coils 211 and 212.

The core 210 includes a yoke portion 210a and magnetic pole portions 210b and 210c. The length of the yoke portion 210a in the front-rear direction is longer than that of the yoke portion 110a. The magnetic pole portions 210b, 210c have the same structure as the magnetic pole portions 110b, 110c of the first embodiment.

The coil 211 has a first coil portion 211a and a second coil portion 211b, and the coil 212 has a first coil portion 212a and a second coil portion 212b. The first coil portions 211a, 212a and the second coil portions 211b, 212b are arranged in the same manner as the first coil portions 111a, 112a and the second coil portions 111b, 112b.

The magnetic pole portions 210b, 210c are in contact with a top surface of the yoke portion 210a which is surrounded by the coils 211, 212.

Since the length of the yoke portion 210a in the front-rear direction is longer than that of the yoke portion 110a, the magnetic pole portions 210b, 210c cover top surfaces of only parts of the second coil portions 211b, 212b which are arranged along a left side surface and a right side surface of the yoke portion 210a.

A power-receiving-side pad has the same structure as the power-transmitting-side pad 21 but is upside down with respect to the power-transmitting-side pad 21. The power-receiving-side pad is installed at the bottom of the vehicle with end surfaces of magnetic pole portions facing the bottom direction.

Since the operation is the same as that of the first embodiment, its description is omitted.

Next, advantages are described. The second embodiment can obtain the same advantages as the first embodiment.

According to the second embodiment, the magnetic pole portions 210b and 210c are structured so that the parts of the second coil portions 211b and 212b which are arranged along the left side surface and the right side surface of the yoke portion 210a can be located within regions occupied by the magnetic pole portions 210b and 210c when viewed from the top-bottom direction as the thickness direction. However, the magnetic pole portions 210b and 210c are not limited to this example, as long as the magnetic pole portions 210b and 210c are structured so that the second coil portions 211b and 212b can be at least partially located within the regions occupied by the magnetic pole portions 210b and 210c when viewed from the top-bottom direction as the thickness direction.

Third Embodiment

Next, a contactless power supply device according to a third embodiment is described. The contactless power supply device of the third embodiment differs from the contactless power supply device of the first embodiment in sizes of yoke portions of a power-transmitting-side pad and a power-receiving-side pad in a left-right direction. The contactless power supply device of the third embodiment has the same structure as the contactless power supply device of the first embodiment except the power-transmitting-side pad and the power-receiving-side pad.

Firstly, a structure of the power-transmitting-side pad is described with reference to FIGS. 8-10. In the drawings, front, rear, left, right, top, and bottom indicate directions in the vehicle.

Figure 8:
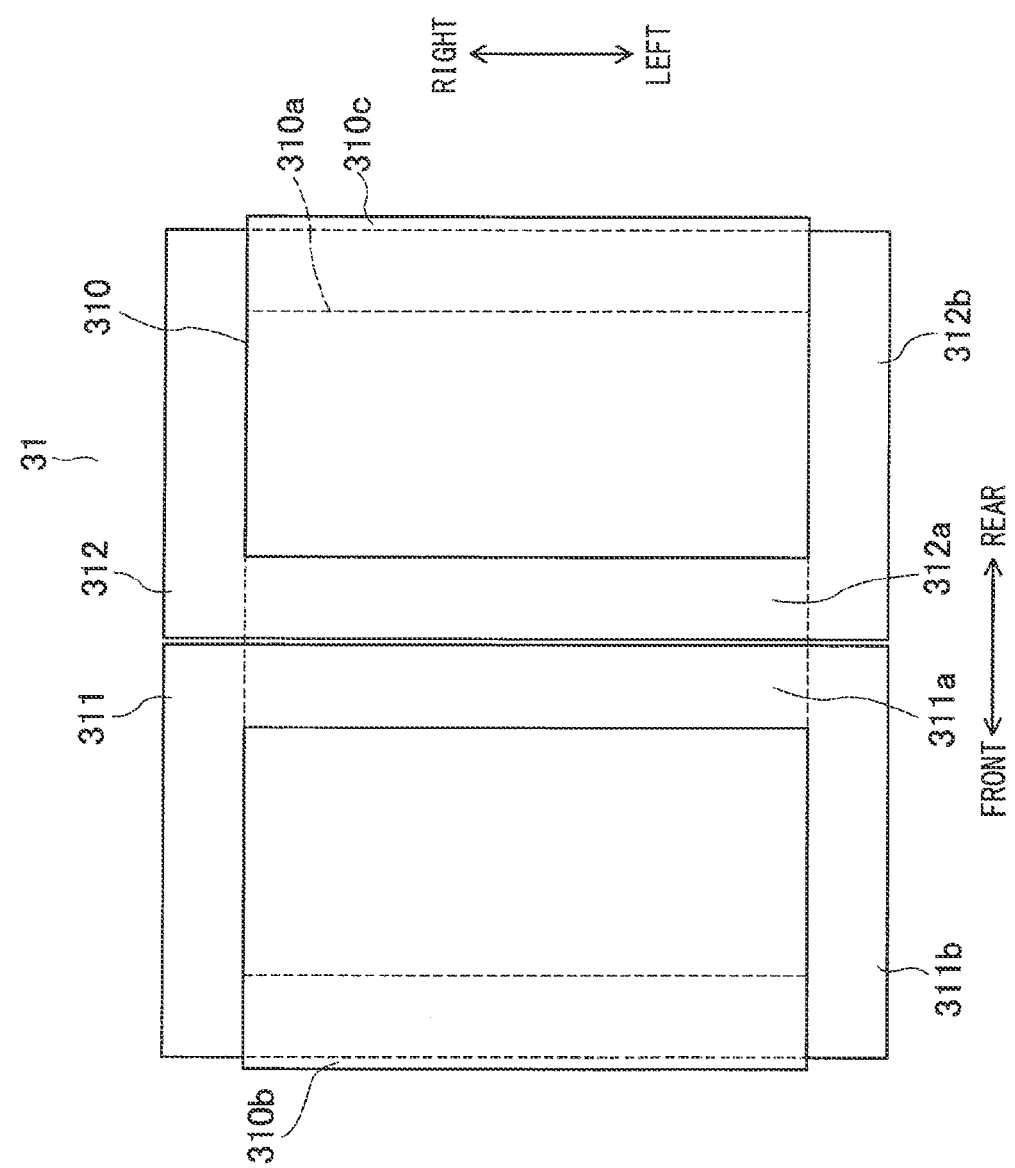
FIG. 8 is a top view of a power-transmitting-side pad according to a third embodiment.
Figure 9:
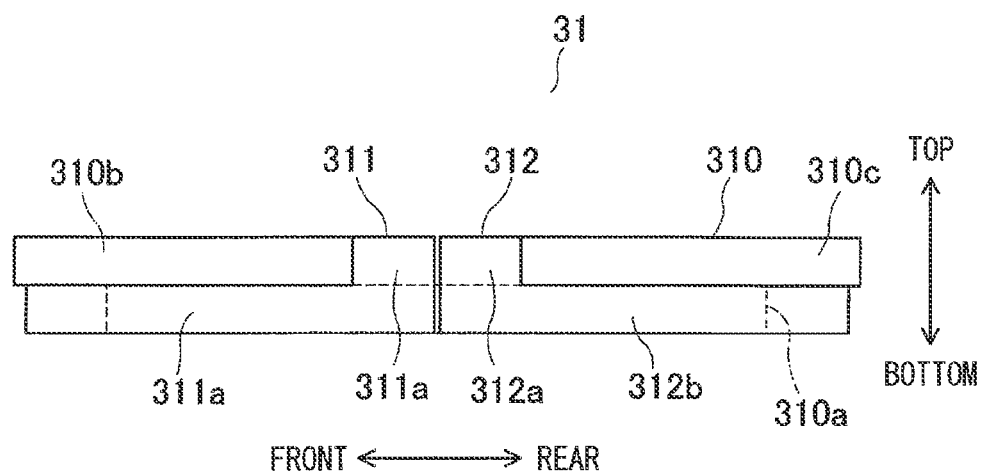
FIG. 9 is a left side view of the power-transmitting-side pad according to the third embodiment.
Figure 10:
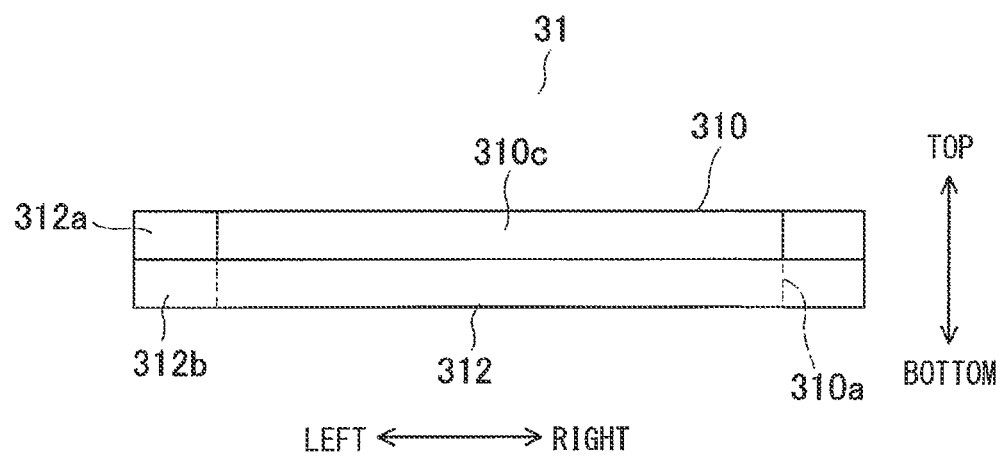
FIG. 10 is a rear side view of the power-transmitting-side pad according to the third embodiment.

As shown in FIGS. 8-10, a power-transmitting-side pad 31 includes a core 310 and coils 311, 312.

The core 310 includes a yoke portion 310a and magnetic pole portions 310b, 310c. The length of the yoke portion 310a in the left-right direction is longer than that of the yoke portion 110a. The magnetic pole portions 310b, 310c have the same structure as the magnetic pole portions 110b, 110c of the first embodiment.

The coil 311 has a first coil portion 311a and a second coil portion 311b, and the coil 312 has a first coil portion 312a and a second coil portion 312b. The first coil portions 311a, 312a and the second coil portions 311b, 312b are arranged in the same manner as the first coil portions 111a, 112a and the second coil portions 111b, 112b.

The magnetic pole portions 310b, 310c are in contact with a top surface of the yoke portion 310a which is surrounded by the coils 311, 312.

Since the length of the yoke portion 310a in the left-right direction is longer than that of the yoke portion 110a, the magnetic pole portions 310b, 310c cover top surfaces of only parts of the second coil portions 311b, 312b which are arranged along a front surface and a rear surface of the yoke portion 310a.

A power-receiving-side pad has the same structure as the power-transmitting-side pad 31 but is upside down with respect to the power-transmitting-side pad 31. The power-receiving-side pad is installed at the bottom of the vehicle with end surfaces of magnetic pole portions facing the bottom direction.

Since the operation is the same as that of the first embodiment, its description is omitted.

Next, advantages are described. The third embodiment can obtain the same advantages as the first embodiment.

According to the third embodiment, the magnetic pole portions 310b and 310c are structured so that the parts of the second coil portions 311b and 312b which are arranged along the front surface and the rear surface of the yoke portion 310a can be located within regions occupied by the magnetic pole portions 310b and 310c when viewed from the top-bottom direction as the thickness direction. However, the magnetic pole portions 310b and 310c are not limited to this example, as long as the magnetic pole portions 310b and 310c are structured so that the second coil portions 311b and 312b can be at least partially located within the regions occupied by the magnetic pole portions 310b and 310c when viewed from the top-bottom direction as the thickness direction.

Fourth Embodiment

Next, a contactless power supply device according to a fourth embodiment is described. The contactless power supply device of the fourth embodiment differs from the contactless power supply device of the first embodiment in that the number of coils of each of a power-transmitting-side pad and a power-receiving-side pad is reduced to one, and its arrangement is changed. The contactless power supply device of the fourth embodiment has the same structure as the contactless power supply device of the first embodiment except the power-transmitting-side pad and the power-receiving-side pad.

Firstly, a structure of the power-transmitting-side pad is described with reference to FIGS. 11-13. In the drawings, front, rear, left, right, top, and bottom indicate directions in the vehicle.

Figure 11:
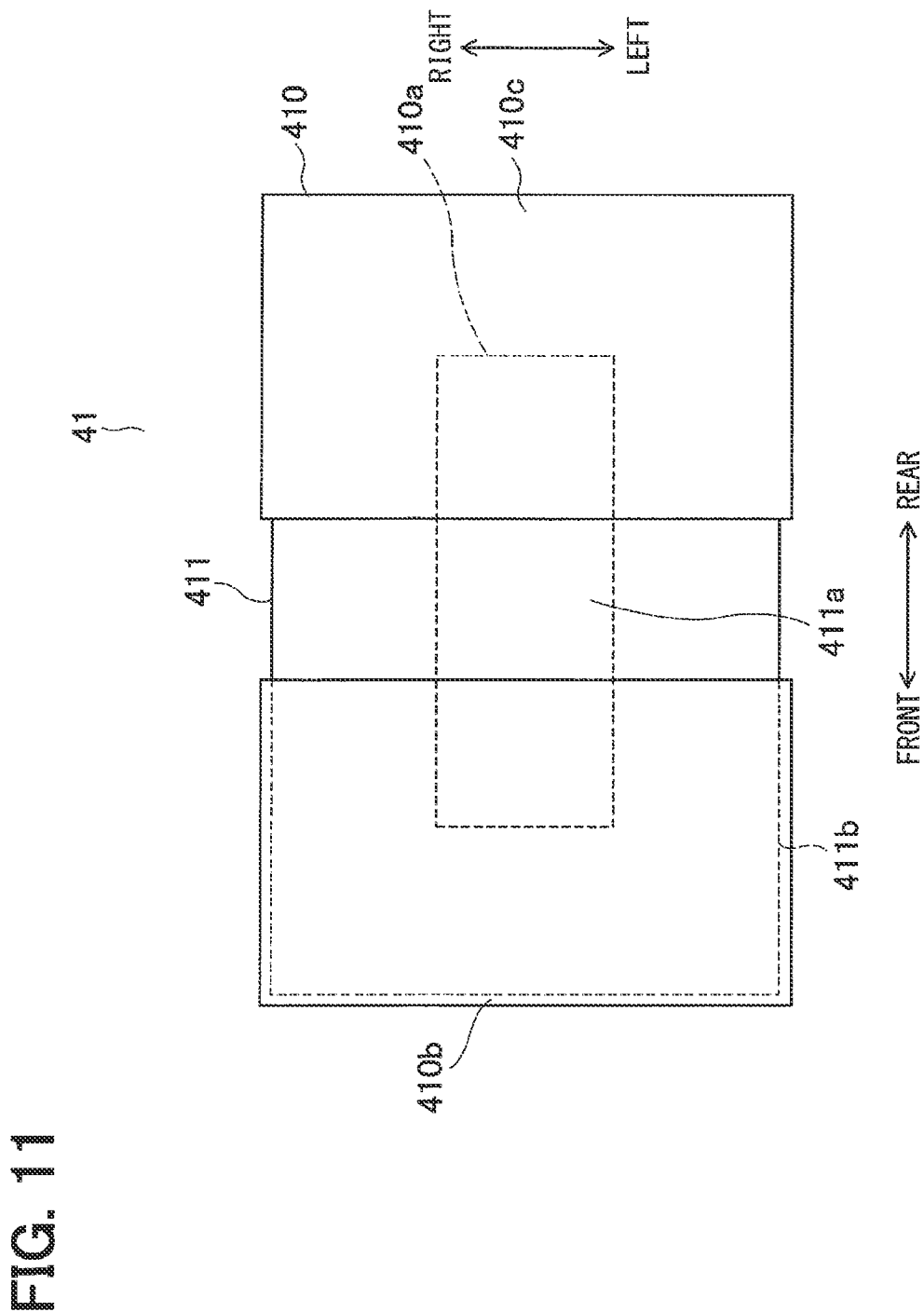
FIG. 11 is a top view of a power-transmitting-side pad according to a fourth embodiment.
Figure 12:
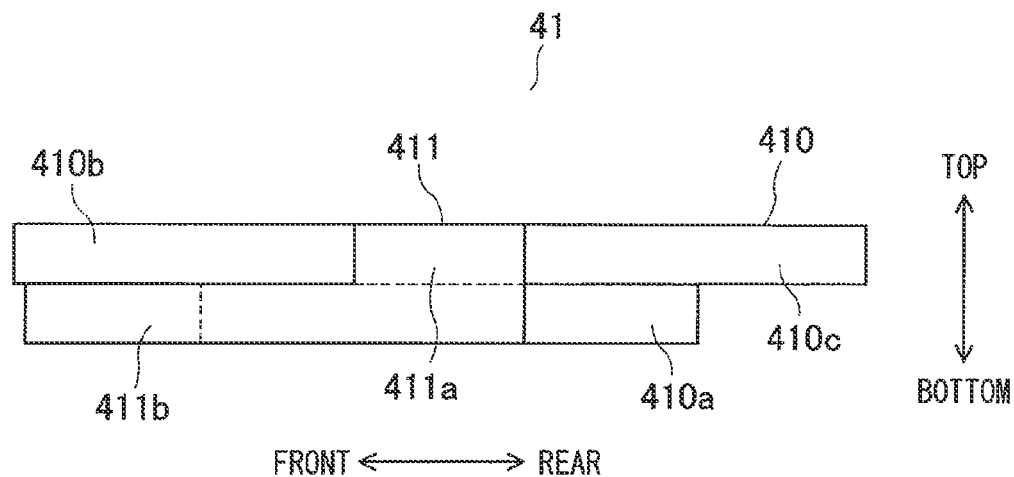
FIG. 12 is a left side view of the power-transmitting-side pad according to the fourth embodiment.
Figure 13:
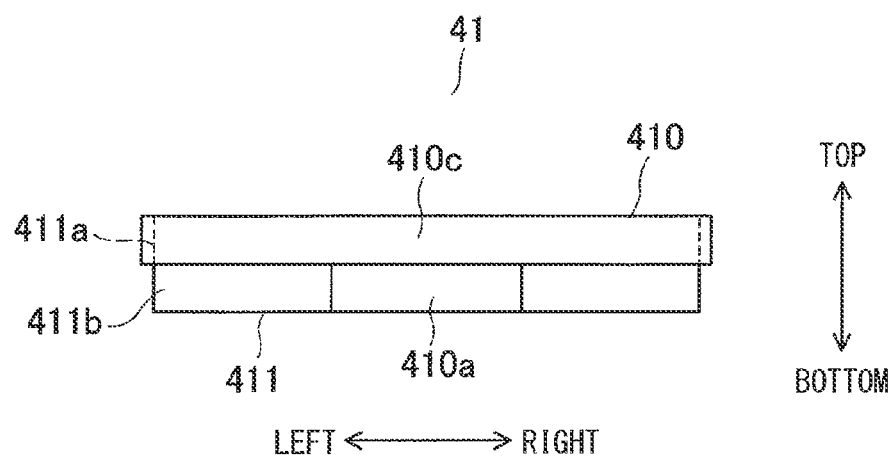
FIG. 13 is a rear side view of the power-transmitting-side pad according to the fourth embodiment.

As shown in FIGS. 11-13, a power-transmitting-side pad 41 includes a core 410 and a coil 411. The core 410 includes a yoke portion 410a and magnetic pole portions 410b, 410c.

Each of the yoke portion 410a and the magnetic pole portions 410b, 410c has a rectangular plate shape and is made of a magnetic material.

The coil 411 has a first coil portion 411a and a second coil portion 411b.

The first coil portion 411a is arranged along a top surface of the yoke portion 410a, where the power-transmitting-side pad faces a power-receiving-side pad, in such a manner that the first coil portion 411a extends in the left-right direction almost at the middle of the yoke portion 110a in the front-rear direction. The second coil portion 411b is arranged along a left side surface, a front surface, and a right side surface of the yoke portion 410a.

The magnetic pole portion 410b is in contact with a top surface of the yoke portion 410a, where the first coil portion 411a is arranged, surrounded by the coil 411. The magnetic pole portion 410c is in contact with the top surface of the yoke portion 410a on the rear side of the first coil portion 411a. The magnetic pole portion 410b is structured so that the second coil portion 411b can be located within a region occupied by the magnetic pole portion 410b when viewed from the top-bottom direction as the thickness direction. The sizes of the magnetic pole portions 410b and 410c in the thickness direction are equal to the size of the first coil portion 411a in the top-bottom direction. The yoke portion 410a and the magnetic pole portions 410b and 410c are integrated together.

The power-receiving-side pad has the same structure as the power-transmitting-side pad 41 but is upside down with respect to the power-transmitting-side pad 41. The power-receiving-side pad is installed at the bottom of the vehicle with end surfaces of magnetic pole portions facing the bottom direction.

Since the operation is the same as that of the first embodiment, its description is omitted.

Next, advantages are described. The fourth embodiment can obtain the same advantages as the first embodiment.

Fifth Embodiment

Next, a contactless power supply device according to a fifth embodiment is described. The contactless power supply device of the fifth embodiment differs from the contactless power supply device of the first embodiment in that an electrical conductor is added to each of a power-transmitting-side pad and a power-receiving-side pad. The contactless power supply device of the fifth embodiment has the same structure as the contactless power supply device of the first embodiment except the power-transmitting-side pad and the power-receiving-side pad.

Firstly, a structure of the power-transmitting-side pad is described with reference to FIGS. 14-16. In the drawings, front, rear, left, right, top, and bottom indicate directions in the vehicle.

Figure 14:
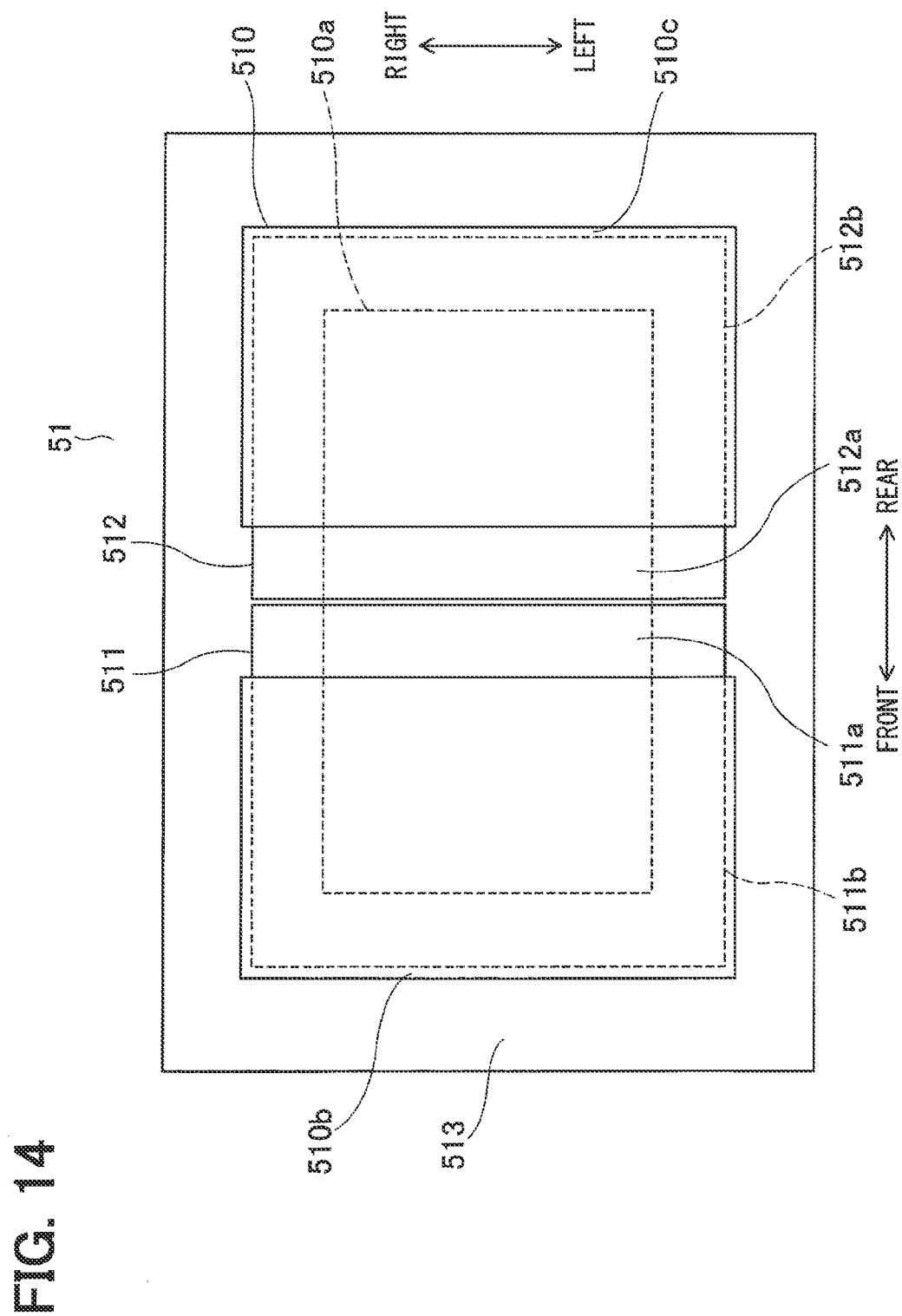
FIG. 14 is a top view of a power-transmitting-side pad according to embodiment.
Figure 15:
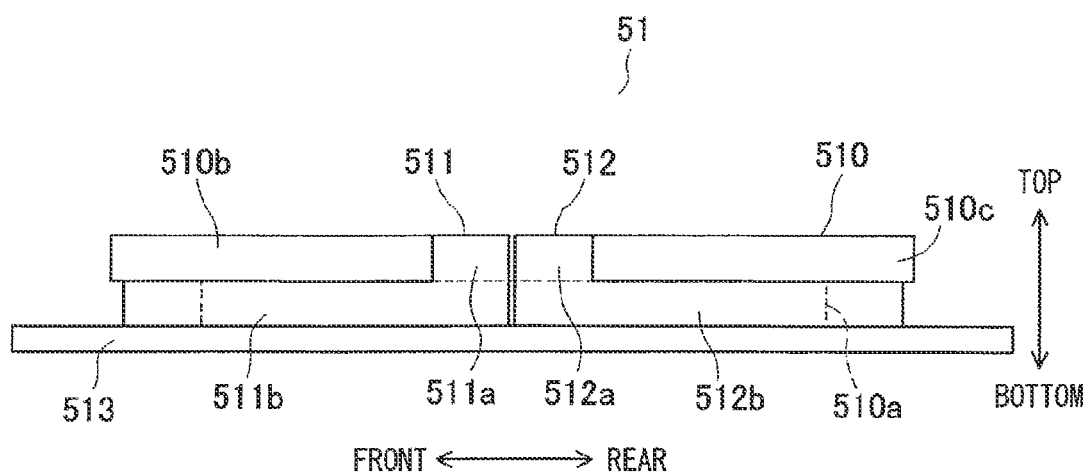
FIG. 15 is a left side view of the power-transmitting-side pad according to the fifth embodiment.
Figure 16:
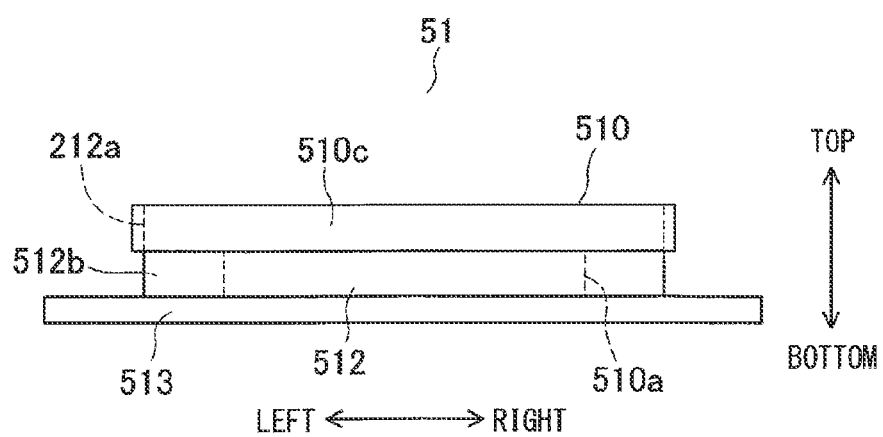
FIG. 16 is a rear side view of the power-transmitting-side pad according to the fifth embodiment.
Figure 17:
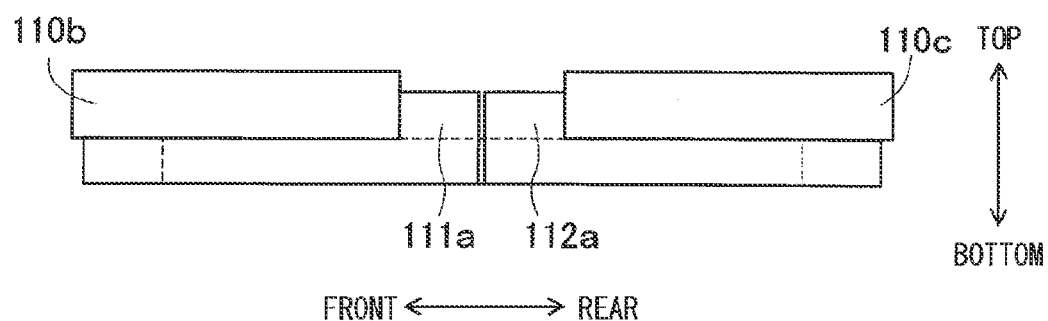
FIG. 17 is a left side view of a power-transmitting-side pad according to a modification.
Figure 18:
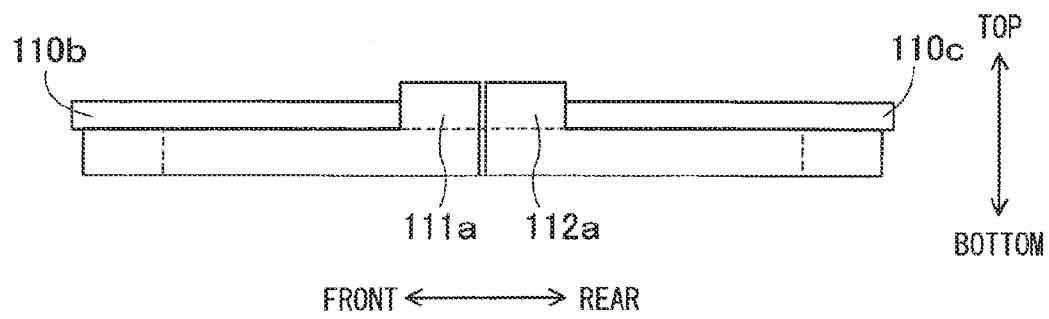
FIG. 18 is a left side view of a power-transmitting-side pad according to another modification.

As shown in FIGS. 14-16, a power-transmitting-side pad 51 includes a core 510, coils 511 and 512, and an electrical conductor 513.

The core 510 includes a yoke portion 510a and magnetic pole portions 510b and 510c. The coil 511 has a first coil portion 511a and a second coil portion 511b, and the coil 512 has a first coil portion 512a and a second coil portion 512b. The yoke portion 510a, the magnetic pole portions 510b, 510c, the first coil portions 511a, 512a, and the second coil portions 511b, 512b have the same structures as the yoke portion 110a, the magnetic pole portions 110b, 110c, the first coil portions 111a, 112a, and the second coil portions 111b, 112b of the first embodiment.

The electrical conductor 513 has a plate shape and reduces leakage flux. Specifically, the electrical conductor 513 is made of aluminum, for example. The electrical conductor 513 is in contact with bottom surfaces of the yoke portion 510a and the second coil portions 511b, 512b on the opposite side of a surface of the yoke portion 510a where the first coil portions 511a, 512a are arranged. Further, the electrical conductor 513 is structured so that the core 510 and the coils 511, 512 can be located within a region occupied by the electrical conductor 513 when viewed from the top-bottom direction as the thickness direction of the yoke portion 510a.

A power-receiving-side pad has the same structure as the power-transmitting-side pad 51 but is upside down with respect to the power-transmitting-side pad 21. The power-receiving-side pad is installed at the bottom of the vehicle with end surfaces of magnetic pole portions facing the bottom direction.

Since the operation is the same as that of the first embodiment, its description is omitted.

Next, advantages are described.

According to the fifth embodiment, as shown in FIGS. 14-16, the electrical conductor 513 is arranged on the bottom surface side which is on the opposite side of the surface of the yoke portion 510a where the first coil portions 511a, 512a are arranged. Magnetic flux flowing on the bottom surface side of the yoke portion 510a is leakage flux and does not contribute to power transmission. When leakage flux crosses the electrical conductor 513, eddy current flows in the electrical conductor 513. When leakage flux flows, magnetic flux cancelling the leakage flux is generated. Thus, the leakage flux can be reduced.

According to the fifth embodiment, as shown in FIGS. 14-16, the electrical conductor 513 is structured so that the core 510 and the coils 511, 512 can be located within a region occupied by the electrical conductor 513 when viewed from the top-bottom direction as the thickness direction of the yoke portion 510a. Thus, leakage flux surely crosses the electrical conductor 513. Therefore, the leakage flux can be surely reduced.

According to the fifth embodiment, as shown in FIGS. 14-16, the electrical conductor 513 is in contact with the yoke portion 510a and the second coil portions 511b, 512b. Thus, heat of the yoke portion 510a and the second coil portions 511b, 512b can be efficiently released. Therefore, an increase in temperature of the power-receiving-side pad and the power-transmitting-side pad can be reduced.

In the first to fifth embodiments, the size of the magnetic pole portion in the thickness direction is equal to the size of the first coil portion in the top-bottom direction. However, it is not limited to this example. As shown in HG. 17 which is based on the first embodiment, the sizes of the magnetic pole portions 110b, 110c in the thickness direction can be smaller than the sizes of the first coil portions 111a, 112a in the top-bottom direction. Further, as shown in HG. 18 which is based on the first embodiment, the sizes of the magnetic pole portions 110b, 110c in the thickness direction can be larger than the sizes of the first coil portions 111a, 112a in the top-bottom direction.

(Modifications)

While the present disclosure has been described with reference to embodiments thereof, it is to be understood that the disclosure is not limited to the embodiments. The present disclosure is intended to cover various modifications and equivalent arrangements within the spirit and scope of the present disclosure.

In the first to the fifth embodiments, the power-receiving-side pad has the same structure as the power-transmitting-side pad. However, the present disclosure is not limited to this example. The power-receiving-side pad can have a different structure from the power-transmitting-side pad. For example, the power-transmitting-side pad of the first embodiment can be used in combination with the power-receiving-side pad having the same structure as the power-transmitting-side pad of any one of the second to the fifth embodiments. In this way, each of the power-transmitting-side pads of the first to the fifth embodiments can be used in combination with the power-receiving-side pad having the same structure as the power-transmitting-side pad of any one of the first to the fifth embodiments.

In the first to the fifth embodiments, the power-transmitting-side pad is installed on the ground in the parking space, and the power-receiving-side pad is installed at the bottom of the vehicle. However, the present disclosure is not limited to this example. The power-transmitting-side pad can be installed on a road, on a floor of a building, or in the ground. Further, the power-transmitting-side pad can be installed on a wall or ceiling of a building. In this case, power transmission can be performed in the same manner by installing the power-receiving-side pad on a side surface or ceiling of the vehicle.

What is claimed is:

1. A contactless power supply device comprising:
a power-transmitting-side pad, and
a power-receiving-side pad, wherein
each of the power-transmitting-side pad and the power-receiving-side pad has a core made of a magnetic material and a coil in contact with the core,
the power-transmitting-side pad transmits power to the power-receiving-side pad in a contactless manner with the power-transmitting-side pad facing the power-receiving-side pad,
the core has a plate-shaped yoke portion,
the coil has a first coil portion and a second coil portion,
the first coil portion is arranged on one of opposing surfaces of each yoke portion in a thickness direction of the yoke portion, and the one of the opposing surfaces of the yoke portion of the power-transmitting-side pad faces the one of the opposing surfaces of the yoke portion of the power-receiving-side pad,
the second coil portion is arranged along an outer periphery of each yoke portion,
the core has a magnetic pole portion;
the magnetic pole portion is in contact with the one of the opposing surfaces of the yoke portion;
the one of the opposing surfaces of the yoke portion is surrounded by the coil;
the first coil portion is arranged on the one of the opposing surfaces of the yoke portion; and
the second coil portion is at least partially located within a region occupied by the magnetic pole portion when viewed from the thickness direction of the yoke portion.

2. The contactless power supply device according to claim 1, wherein
a size of the magnetic pole portion in the thickness direction is equal to a size of the first coil portion in the thickness direction.

3. The contactless power supply device according to claim 1, wherein
the yoke portion and the magnetic pole portion are integrated together.

4. The contactless power supply device according to claim 1, wherein
the yoke portion and the magnetic pole portion are made of materials having different magnetic properties.

5. The contactless power supply device according to claim 1, further comprising:
an electrical conductor arranged on a side of the other of the opposing surfaces of the yoke portion.

6. The contactless power supply device according to claim 5, wherein
the core and the coil are located within a region occupied by the electrical conductor when viewed from the thickness direction of the yoke portion.

7. The contactless power supply device according to claim 5, wherein
the electrical conductor is in contact with the yoke portion and the second coil portion.

8. The contactless power supply device according to claim 1, wherein
the power-transmitting-side pad is installed outside a vehicle,
the power-receiving-side pad is mounted on the vehicle, and
the power is transmitted to the vehicle from outside the vehicle in the contactless manner.

9. The contactless power supply device according to claim 1, wherein:
the coil is not arranged on the other of opposing surfaces of each yoke portion.

10. The contactless power supply device according to claim 1, wherein:
the first coil portion and the second coil portion are arranged on a same plane in parallel to the one of the opposing surfaces of the yoke portion.

* * * * *